Aug. 25, 1931.  G. F. COUCH  1,820,443
BRAKE HANGER BRACKET
Filed June 23, 1927   2 Sheets-Sheet 1
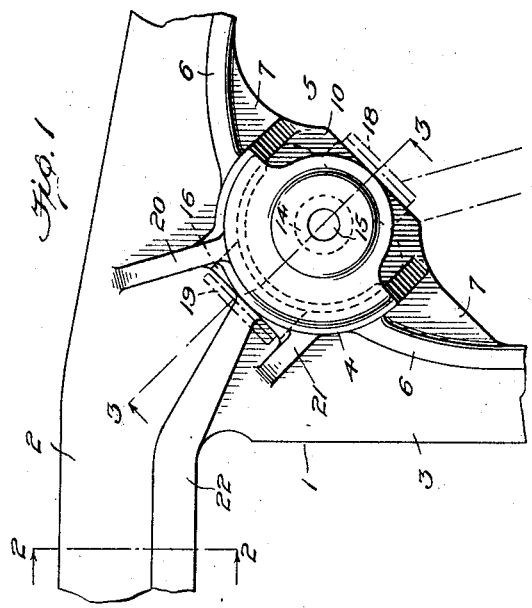
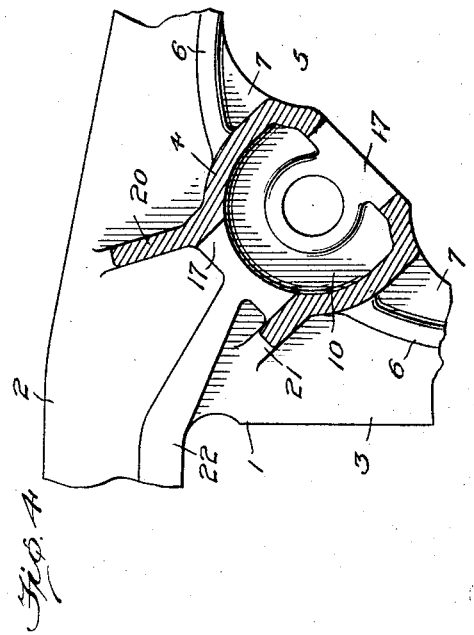
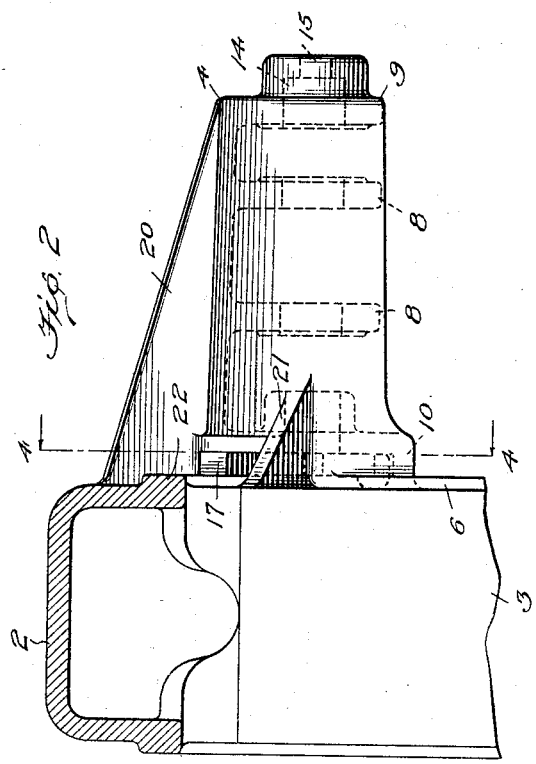
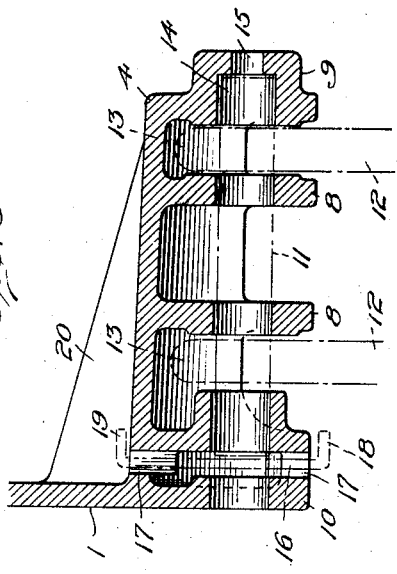
Inventor
Glenn F. Couch
By
Attorney

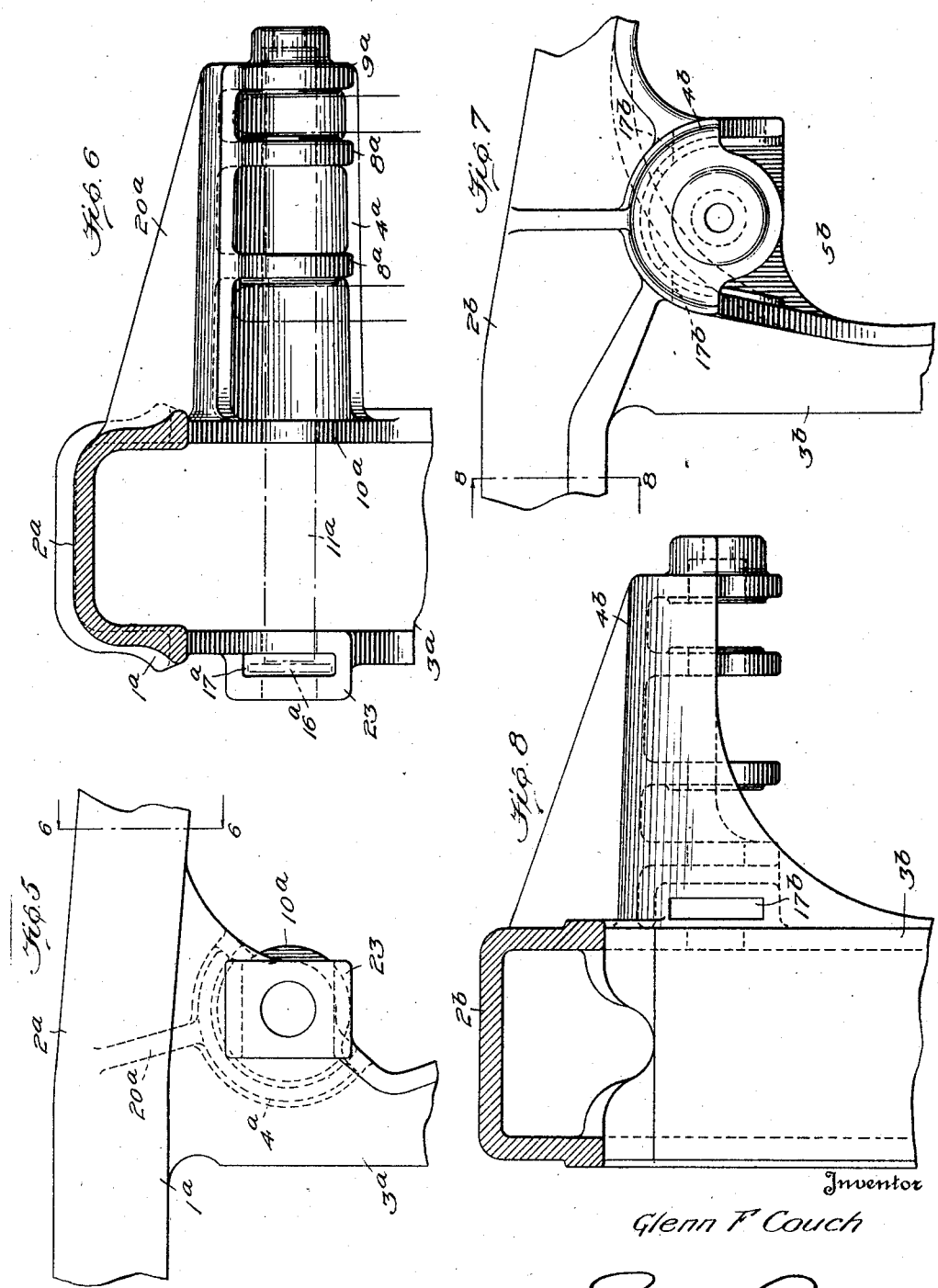

Patented Aug. 25, 1931

1,820,443

UNITED STATES PATENT OFFICE

GLENN F. COUCH, OF ROCHESTER, NEW YORK, ASSIGNOR TO THE GOULD COUPLER COMPANY, OF NEW YORK, N. Y., A CORPORATION OF MARYLAND

BRAKE HANGER BRACKET

Application filed June 23, 1927. Serial No. 200,978.

This invention relates to side frames and, more particularly, to means extending therefrom for supporting brake hangers.

The principal object of my invention, generally considered, is the construction of brake hanger brackets, of the type which receive a hanger pin adapted to extend through the eyes of a brake hanger for supporting the same, and the preferably integral connection of said brackets to the associated side frame, so as to reduce weight and provide for shortening the brake hanger pin, dispensing with right and left-hand cores and securing a neater appearance.

An object of my invention is the improvement in brake hanger brackets of the "Downing" type for minimizing the projection of said brackets beyond the outline of the frame members, thereby saving in weight while, at the same time, avoiding manufacturing difficulties.

Another object of my invention is the provision of a brake hanger bracket which is preferably integral with an associated side frame and generally U-shape in cross section, said bracket having transverse webs apertured for receiving a hanger pin and means for locking said pin in place extending on the same side of the frame as that from which the bracket extends, whereby the length of said pin may be considerably shortened.

A further object of my invention is to provide a brake hanger bracket of the integral type, U-shaped in cross section, for receiving and mounting the apertured ends of a U-shaped brake hanger, with means for locking said mounting means in place disposed outside of the frame members, whereby projection thereof into the main side frame core is obviated with a consequent facilitation of the manufacture of such frames.

A still further object of my invention is to provide side frames with integral brake hanger brackets extending therefrom and with their sections so inclined that similar cores may be used on either side of the window opening of the frame, thereby facilitating manufacture and, at the same time, providing a frame of neater appearance.

Other objects and advantages of the invention will be apparent as the description proceeds.

Referring to the drawings illustrating my invention, the scope whereof is defined by the appended claims:

Figure 1 is a side elevation of that portion of a side frame adjacent the junction between the compression member and one of the bolster guide columns, showing one form of my improved brake hanger bracket extending therefrom.

Figure 2 is a fragmentary sectional view on the line 2—2 of Figure 1 looking in the direction of the arrows.

Figure 3 is a sectional view of the brake hanger bracket taken on the line 3—3 of Figure 1 looking in the direction of the arrows.

Figure 4 is a transverse sectional view of the bracket on the line 4—4 of Figure 2 looking in the direction of the arrows.

Figure 5 is a side elevation of a fragmentary portion of a side frame showing a modified form of my brake hanger bracket extending therefrom.

Figure 6 is a sectional view on the line 6—6 of Figure 5 looking in the direction of the arrows.

Figure 7 is a view corresponding to Figure 1 but showing another modification of my invention.

Figure 8 is a sectional view on the line 8—8 of Figure 7 looking in the direction of the arrows.

Referring to the drawings in detail, like parts being designated by like reference characters, and first considering the embodiment of my invention illustrated in Figures 1 to 4, inclusive, there is shown a fragmentary portion of a side frame 1 comprising a compression member 2 with bolster guide columns 3, only one of which, however, is shown, extending therefrom. It will be understood that the frame 1 may be of usual construction and that the lower ends of said guide columns connect with a tension member and the ends of said tension member extend outwardly to join with the ends of the compression member, such construction, however, being well known and not being necessary to a full disclosure of my invention, is not illustrated.

Extending from the inner side of the frame 1 is a brake hanger bracket or lug 4, said bracket being generally inverted U-shaped or semi-circular in cross section, as illustrated particularly in Figure 4. In order to avoid having the bracket 4 project to any great extent into the substantially triangular opening 5 outside of the guide column 3 and below the compression member 2, said bracket is preferably set upwardly and inwardly into the compression member at approximately the junction therebetween, as illustrated, so that the lower and outer outline of said members intersects or merges with the sides of the brake hanger bracket 4, as illustrated particularly in Figures 1 and 4. That portion of the bracket extending beyond the outline or beaded portion 6 of the frame is preferably braced thereto by substantially triangular gussets or webs 7.

The bracket 4 is preferably provided with a plurality of transverse webs or partitions 8, an outer end wall 9 and an inner end wall 10, said partitions and inner end wall being apertured for receiving a hanger pin indicated diagrammatically by dot and dash lines at 11 for swingingly or pivotally mounting the upper ends of a brake hanger indicated diagrammatically by dot and dash lines at 12, by extending through the eyes 13 thereof. In other words, the brake hanger 12 may be of usual form, that is, generally U-shape with eyes at the ends of the arms thereof and supported by having the pin 11 extend through said eyes. The lower end of the brake hanger is adapted to support a brake head and shoe (not shown) as will be understood by those skilled in the art. The outer end wall 9 of the bracket is provided with a pocket 14 receiving the end of the hanger pin 11 and said wall may also be formed with a relatively small aperture 15 to provide access to said pocket 14 to assist in removing the hanger pin 11.

For locking the hanger pin 11 in place, a cotter or locking device 16 is provided, said device preferably taking the form of a plate which extends through slots 17 between the inner end wall 10 and the adjacent intermediate wall or partition 8 and closes the perforations or apertures through which the hanger pin was inserted, thereby locking said pin in place, as illustrated particularly in Figure 3. One end 18 of the plate 16 may be normally bent at right angles as illustrated and the other end 19 may be bent from straight to right angle position after insertion, whereby the same is securely held in place, thereby preventing undesired removal of the hanger pin 11. It will be seen that the apertures for receiving the pin 11 are alined below the outline of the frame, whereby the other wall thereof does not interfere with the free insertion of said pin from the other side of the frame.

For rigidifying the connection between the bracket 4 and the frame, a triangular web or gusset 20 may be provided extending from the compression member and gradually tapering and merging into the upper portion of the bracket 4 at the end thereof. A relatively short triangular gusset 21 may also be provided extending between the bolster guide column 3 and the bracket 4 on the lower or inner side of the slot 17. The beading or rib 22 on the lower edge of the compression member, between the bolster guide columns, may be extended diagonally outward and downward to merge with the bracket 4 adjacent the upper slot 17.

From the foregoing, it will be apparent that I have provided a brake hanger bracket integral with an associated side frame in which weight is eliminated by insetting the same toward the junction between the compression member and bolster guide column and in which the hanger pin need only be relatively short by having the locking means disposed outside of the frame on the same side as the bracket. This construction also avoids the projection of any part of the bracket into the main side frame core, thereby facilitating the manufacture of such frame. By positioning the bracket so that the sides thereof are angularly disposed, core-making is facilitated by the avoidance of right and left-hand cores and, at the same time, a frame of a neater appearance is secured. In the present embodiment, it will be seen that the angular disposition of the sides of the brake hanger bracket is approximately or close to forty-five degrees to the horizontal so that the center line of the U-shaped section thereof approximately bisects the exterior angle between the compression member and bolster guide column. It will also be noted that the section is approximately semicircular and the apertures in the webs 8 and walls 9 and 10 are approximately concentric therewith. The slots 17 for receiving the locking means 16 preferably extend at a similar angle, that is, the center line thereof preferably corresponds with the center line of the section of the bracket.

Referring now to the embodiment of my invention illustrated in Figures 5 and 6, a construction is there disclosed in which some of the advantages secured by the previously described embodiment are obtained. There is here shown a fragmentary portion of a side frame 1ª with a brake hanger bracket 4ª extending therefrom and, in this instance, the junction between the compression member 2ᵃ and the bolster guide column 3ᵃ is so extended that the bracket 4ᵃ, which is angularly disposed as in the first embodiment, extends from said junction without dropping below the outline thereof. As in the previous embodiment, said bracket is provided with apertured partitions 8ᵃ, an outer end wall 9ᵃ correspondingly formed and an inner end wall 10ᵃ. Instead, however, of having a slotted portion for receiving a locking member provided on the same side of the frame as in the first embodiment, said slotted portion is provided on the other side of the frame as an extension 23 formed with a slot 17ᵃ for receiving a similar locking plate 16ᵃ. In the present embodiment, the length of the hanger pin 11ᵃ is not decreased but the other advantages referred to are secured. As in the previous embodiment, the brake hanger bracket 4ᵃ may be rigidified with respect to the frame by a triangular gusset or web 20ᵃ.

Referring now to the embodiment of my invention illustrated in Figures 7 and 8, a construction is there disclosed which is very similar to that of the first embodiment except that the walls of the bracket 4ᵇ are arranged substantially vertical rather than inclined, thereby projecting to a greater distance into the triangular opening 5ᵇ below and outside of the compression member 2ᵇ and bolster guide column 3ᵇ. Otherwise, the bracket 4ᵇ may be substantially identical with the bracket 4 of the first embodiment except that the slot 17ᵇ for receiving the locking plate (not shown) extends substantially horizontal rather than inclined. The other advantages mentioned in connection with the first embodiment are, however, secured as it will be apparent that a relatively short hanger pin may be employed.

From the foregoing description, it will be seen that, in all of the embodiments described, the brake hanger is conveniently locked in place by a flat plate which is positioned so as to be readily accessible for application and removal, especially in the first embodiment.

Having now described my invention, I claim:

1. In combination, a truck side frame formed with a brake hanger lug extending from a side thereof, said lug being generally inverted U-shape in cross section with the arms of the U extending diagonally, a plurality of transverse webs extending between the elements of said U and perforated for receiving brake hanger connecting means, and a slotted portion disposed outside of the side of the frame for receiving means for locking said connecting means in place.

2. In combination, a cast metal truck side frame having a compression member and bolster guide columns extending therefrom, a brake hanger lug integral therewith and extending from a side thereof, said lug being generally inverted U-shape in cross section with the arms of the U inclined, a plurality of transverse webs extending from the elements of said U and apertured for receiving means for pivotally connecting a brake hanger thereto, said lug joining with the frame at approximately the junction between the compression member and a bolster guide column with the outline of said members intersecting the arms of said lug.

3. In combination, a truck side frame having a compression member and bolster guide columns extending therefrom, a brake hanger bracket extending from approximately the junction between said compression member and a bolster guide column, said bracket being generally inverted U-shape in cross section with the center line of said U approximately bisecting the exterior angle between the compression member and bolster guide column, the lower and outer outline of said compression member and bolster guide column meeting the sides of the bracket in order to avoid having said bracket extend much beyond said members, whereby weight is economized.

4. In combination, a truck side frame formed with a brake hanger bracket extending from a side thereof, said bracket being generally semi-circular in cross section with transverse webs provided between the sides thereof, said webs being formed with apertures substantially concentric with the walls of said bracket for receiving a brake hanger pin for supporting an associated hanger, said bracket being slotted adjacent the junction with the frame for receiving locking means for holding said pin in place.

5. In combination, a truck side frame formed with a brake hanger bracket generally inverted U-shape in cross section extending therefrom, transverse webs connecting the sides of said bracket and apertured for receiving a brake hanger pin, said apertures lying just below the outline of the adjacent members of the frame whereby said pin is freely insertable from the other side of said frame, the arms of said section being inclined so as to extend approximately from the intersection of the associated frame members, that portion of the bracket, adjacent said frame, being slotted for the reception of locking means for said pin, said slot extending at an angle corresponding with the inclination of the bracket.

6. A brake hanger bracket comprising a lug adapted to extend from a truck side frame and formed generally inverted U-shape in cross section with the arms of the U extending diagonally and braced one to the other by a plurality of transverse webs, said webs being perforated for receiving brake hanger connecting means and said lug being provided with a slotted portion outside of the adjacent side of the frame for receiving means for locking said connecting means in place.

7. A brake hanger bracket comprising a lug generally inverted U-shape in cross section with the arms of said U inclined, a plurality of transverse webs extending from the elements of said U and provided with apertures for receiving pivotal connecting means for a brake hanger, said lug joining integrally with an associated frame at approximately the junction between the compression member and a bolster guide column thereof with the lower and outer outline of said members intersecting the arms of said lug, whereby that portion of said lug extends very little beyond the elements of said frame.

8. A brake hanger bracket extending from approximately the junction between the compression member and a bolster guide column of an associated truck side frame and being generally inverted U-shape in cross section with the center line of said U extending at about forty-five degrees to the horizontal, the lower exterior outline of said compression member and bolster guide column merging with the sides of the bracket, whereby said bracket extends very little beyond said members for economizing weight.

9. In combination, a truck side frame formed with a brake hanger lug extending from a side thereof, said lug being generally U-shape in cross-section with a plurality of transverse webs connecting the elements of said U and perforated for receiving brake hanger connecting means, a portion of the lug outwardly of the adjacent side of the frame being slotted for receiving means for locking the connecting means in place.

10. In combination, a truck side frame, a brake hanger bracket generally U-shape in cross-section extending therefrom and integral therewith, the sides of said bracket being connected by transverse webs apertured for receiving a brake hanger pin, said apertures lying just below the outline of the adjacent frame members whereby said pin is freely insertable from the other side of said frame, that portion of the bracket adjacent said frame being slotted for the reception of locking means for said pin.

11. A brake hanger bracket formed generally U-shape in cross-section with the arms of the U braced one to another by a plurality of transverse webs perforated for receiving means for connecting a brake hanger thereto, said bracket being slotted outwardly of the adjacent side of the frame for receiving means for locking said connecting means in place.

In testimony whereof I affix my signature.

GLENN F. COUCH.